(12) United States Patent
Amidon et al.

(10) Patent No.: US 7,840,903 B1
(45) Date of Patent: Nov. 23, 2010

(54) GROUP CONTENT REPRESENTATIONS

(75) Inventors: Christopher M. Amidon, Apex, NC (US); Richard J. Walsh, Raleigh, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 682 days.

(21) Appl. No.: 11/760,019

(22) Filed: Jun. 8, 2007

Related U.S. Application Data

(63) Continuation-in-part of application No. 11/678,781, filed on Feb. 26, 2007.

(51) Int. Cl.
*G06F 3/048* (2006.01)

(52) U.S. Cl. .................. 715/757; 715/733; 715/751; 715/753

(58) Field of Classification Search .............. 715/733, 715/751, 757, 753
See application file for complete search history.

(56) References Cited

U.S. PATENT DOCUMENTS

| | | | |
|---|---|---|---|
| 5,309,359 A | 5/1994 | Katz et al. | |
| 5,404,295 A | 4/1995 | Katz et al. | |
| 5,736,982 A | 4/1998 | Suzuki et al. | |
| 5,754,939 A | 5/1998 | Herz et al. | |
| 5,923,330 A | 7/1999 | Tarlton et al. | |
| 6,094,653 A | 7/2000 | Li et al. | |
| 6,167,441 A | 12/2000 | Himmel | |
| 6,182,808 B1 | 2/2001 | Walton et al. | |
| 6,247,002 B1 | 6/2001 | Steels | |
| 6,256,043 B1 | 7/2001 | Aho et al. | |
| 6,275,819 B1 | 8/2001 | Carter | |
| 6,311,194 B1 | 10/2001 | Sheth et al. | |
| 6,327,590 B1 | 12/2001 | Chidlovskii et al. | |

(Continued)

FOREIGN PATENT DOCUMENTS

EP 1689143 A1 10/2004

(Continued)

OTHER PUBLICATIONS

Meez—Avatars for MySpace, Xanga and IM, http://mashable.com/2006/08/22/meez-avatars-for-myspace-xanga-and-im/.

(Continued)

*Primary Examiner*—Weilun Lo
*Assistant Examiner*—Tuyetlien T Tran
(74) *Attorney, Agent, or Firm*—Withrow & Terranova, PLLC

(57) ABSTRACT

A system and method are provided for representing content made accessible by a group of users. In general, a group content representation that is descriptive of content made accessible by the group of users is presented to an interested user. In one embodiment, the users are represented by avatars in a virtual environment, and the group content representation is presented in a view of the virtual environment provided to the interested user. The group content representation may be presented at a fixed or dynamic location within the virtual environment. For example, the group content representation may be presented at a location relative to the avatars representing the group of users in the virtual environment. Based on the group content representation, the interested user is enabled to quickly and easily determine whether content of interest is accessible from the group of users.

20 Claims, 12 Drawing Sheets

U.S. PATENT DOCUMENTS

| | | | |
|---|---|---|---|
| 6,349,301 B1 | 2/2002 | Mitchell et al. | |
| 6,356,879 B2 | 3/2002 | Aggarwal et al. | |
| 6,389,409 B1 | 5/2002 | Horovitz et al. | |
| 6,453,294 B1 | 9/2002 | Dutta et al. | |
| 6,457,010 B1 | 9/2002 | Eldering et al. | |
| 6,463,433 B1 | 10/2002 | Baclawski | |
| 6,498,795 B1 | 12/2002 | Zhang et al. | |
| 6,545,682 B1 | 4/2003 | Ventrella et al. | |
| 6,546,405 B2 | 4/2003 | Gupta et al. | |
| 6,553,367 B2 | 4/2003 | Horovitz et al. | |
| 6,560,578 B2 | 5/2003 | Eldering | |
| 6,580,811 B2 | 6/2003 | Maurer et al. | |
| 6,581,072 B1 | 6/2003 | Mathur et al. | |
| 6,610,105 B1 | 8/2003 | Martin, Jr. et al. | |
| 6,629,100 B2 | 9/2003 | Morris et al. | |
| 6,629,136 B1 | 9/2003 | Naidoo | |
| 6,672,961 B1 | 1/2004 | Uzun | |
| 6,675,159 B1 | 1/2004 | Lin et al. | |
| 6,701,362 B1 | 3/2004 | Subramonian et al. | |
| 6,725,259 B1 | 4/2004 | Bharat | |
| 6,738,764 B2 | 5/2004 | Mao et al. | |
| 6,744,922 B1 | 6/2004 | Walker | |
| 6,772,160 B2 | 8/2004 | Cho et al. | |
| 6,795,972 B2 | 9/2004 | Rovira | |
| 6,854,012 B1 | 2/2005 | Taylor | |
| 6,854,069 B2 | 2/2005 | Kampe et al. | |
| 6,910,186 B2 | 6/2005 | Kim | |
| 6,917,944 B1 | 7/2005 | Prasad et al. | |
| 6,948,131 B1 | 9/2005 | Neven et al. | |
| 6,970,840 B1 | 11/2005 | Yu et al. | |
| 7,006,098 B2 | 2/2006 | Bickmore et al. | |
| 7,034,678 B2 | 4/2006 | Burkley et al. | |
| 7,036,082 B1 | 4/2006 | Dalrymple et al. | |
| 7,054,900 B1 | 5/2006 | Goldston | |
| 7,107,549 B2 | 9/2006 | Deaton et al. | |
| 7,150,030 B1 | 12/2006 | Eldering et al. | |
| 7,197,126 B2 | 3/2007 | Kanada | |
| 7,248,677 B2 | 7/2007 | Randall et al. | |
| 7,302,429 B1 | 11/2007 | Wanker | |
| 7,396,281 B2 | 7/2008 | Mendelsohn et al. | |
| 7,599,983 B2 | 10/2009 | Harper et al. | |
| 7,614,016 B2 | 11/2009 | Wong et al. | |
| 2001/0021920 A1 | 9/2001 | Ikeda | |
| 2002/0033848 A1 | 3/2002 | Sciammarella et al. | |
| 2002/0059290 A1 | 5/2002 | Rising, III | |
| 2002/0072922 A1 | 6/2002 | Suzuki et al. | |
| 2002/0085031 A1 | 7/2002 | Conrado et al. | |
| 2002/0113820 A1* | 8/2002 | Robinson et al. | 345/764 |
| 2002/0151327 A1 | 10/2002 | Levitt | |
| 2002/0156875 A1* | 10/2002 | Pabla | 709/220 |
| 2002/0156917 A1 | 10/2002 | Nye | |
| 2003/0002521 A1 | 1/2003 | Traversat et al. | |
| 2003/0005439 A1 | 1/2003 | Rovira | |
| 2003/0028451 A1 | 2/2003 | Ananian | |
| 2003/0051255 A1 | 3/2003 | Bulman et al. | |
| 2003/0061028 A1 | 3/2003 | Dey et al. | |
| 2003/0079177 A1 | 4/2003 | Brintzenhofe et al. | |
| 2003/0110056 A1 | 6/2003 | Berghofer et al. | |
| 2003/0120662 A1 | 6/2003 | Vishik | |
| 2003/0163597 A1 | 8/2003 | Hellman et al. | |
| 2003/0174178 A1 | 9/2003 | Hodges | |
| 2003/0179228 A1 | 9/2003 | Schreiber et al. | |
| 2003/0191814 A1 | 10/2003 | Tran | |
| 2003/0204605 A1 | 10/2003 | Hudson et al. | |
| 2004/0015562 A1 | 1/2004 | Harper et al. | |
| 2004/0024720 A1 | 2/2004 | Fairweather | |
| 2004/0078432 A1 | 4/2004 | Manber et al. | |
| 2004/0117367 A1 | 6/2004 | Smith et al. | |
| 2004/0125136 A1 | 7/2004 | Wallenios | |
| 2004/0162871 A1 | 8/2004 | Pabla et al. | |
| 2004/0170321 A1 | 9/2004 | Gong et al. | |
| 2004/0179039 A1 | 9/2004 | Blattner et al. | |
| 2004/0189701 A1 | 9/2004 | Badt, Jr. | |
| 2004/0193673 A1 | 9/2004 | Samji et al. | |
| 2004/0199867 A1 | 10/2004 | Brandenborg | |
| 2004/0220893 A1 | 11/2004 | Spivack et al. | |
| 2004/0239681 A1 | 12/2004 | Robotham et al. | |
| 2004/0240652 A1 | 12/2004 | Kanada | |
| 2005/0004930 A1 | 1/2005 | Hatta | |
| 2005/0010637 A1* | 1/2005 | Dempski et al. | 709/204 |
| 2005/0013298 A1 | 1/2005 | Srisuresh et al. | |
| 2005/0034107 A1 | 2/2005 | Kendall et al. | |
| 2005/0060746 A1 | 3/2005 | Kim | |
| 2005/0091279 A1 | 4/2005 | Rising, III | |
| 2005/0137015 A1 | 6/2005 | Rogers et al. | |
| 2005/0154701 A1 | 7/2005 | Parunak et al. | |
| 2005/0163135 A1 | 7/2005 | Hopkins | |
| 2005/0198353 A1 | 9/2005 | Zmrzli | |
| 2005/0210387 A1* | 9/2005 | Alagappan et al. | 715/700 |
| 2005/0262539 A1 | 11/2005 | Barton et al. | |
| 2005/0264647 A1 | 12/2005 | Rzeszewski et al. | |
| 2005/0289179 A1 | 12/2005 | Naphade et al. | |
| 2006/0031217 A1 | 2/2006 | Smith et al. | |
| 2006/0047635 A1 | 3/2006 | Kraenzel et al. | |
| 2006/0064411 A1 | 3/2006 | Gross et al. | |
| 2006/0064645 A1 | 3/2006 | Neven et al. | |
| 2006/0111188 A1 | 5/2006 | Winkler | |
| 2006/0148512 A1 | 7/2006 | Ekholm et al. | |
| 2006/0161635 A1 | 7/2006 | Lamkin et al. | |
| 2006/0184579 A1 | 8/2006 | Mills et al. | |
| 2006/0195515 A1 | 8/2006 | Beaupre et al. | |
| 2006/0235790 A1 | 10/2006 | Jung et al. | |
| 2006/0242234 A1* | 10/2006 | Counts et al. | 709/204 |
| 2006/0271997 A1 | 11/2006 | Jacoby et al. | |
| 2006/0277474 A1 | 12/2006 | Robarts et al. | |
| 2006/0282391 A1 | 12/2006 | Peterka et al. | |
| 2007/0013701 A1 | 1/2007 | Segawa et al. | |
| 2007/0094691 A1 | 4/2007 | Gazdzinski | |
| 2007/0127889 A1 | 6/2007 | Seo | |
| 2007/0184855 A1 | 8/2007 | Klassen et al. | |
| 2007/0198364 A1 | 8/2007 | Quoc et al. | |
| 2007/0223675 A1 | 9/2007 | Surin et al. | |
| 2007/0287498 A1 | 12/2007 | Wang et al. | |
| 2007/0288470 A1 | 12/2007 | Kauniskangas et al. | |
| 2007/0299737 A1 | 12/2007 | Plastina et al. | |
| 2008/0052242 A1 | 2/2008 | Merritt et al. | |
| 2008/0059422 A1 | 3/2008 | Tenni et al. | |
| 2008/0091521 A1 | 4/2008 | Ho et al. | |
| 2008/0104114 A1 | 5/2008 | Kasperkiewicz et al. | |
| 2008/0201638 A1 | 8/2008 | Nair | |
| 2008/0222295 A1* | 9/2008 | Robinson et al. | 709/227 |
| 2008/0257134 A1 | 10/2008 | Oppenheimer | |
| 2009/0031006 A1 | 1/2009 | Johnson | |
| 2009/0037822 A1 | 2/2009 | Kandekar et al. | |
| 2009/0119614 A1 | 5/2009 | Tienvieri et al. | |
| 2010/0131584 A1 | 5/2010 | Johnson | |

FOREIGN PATENT DOCUMENTS

| | | |
|---|---|---|
| WO | WO 02/21831 A2 | 3/2002 |
| WO | 1473650 A1 | 3/2004 |
| WO | WO 2004/036902 A1 | 4/2004 |
| WO | WO 2005/020129 A2 | 3/2005 |
| WO | WO 2006/036207 A1 | 4/2006 |

OTHER PUBLICATIONS

Rana El Kaliouby and Peter Robinson, "FAIM: Integrating Automated Facial Affect Analysis in Instant Messaging," In Proceedings of ACM International Conference on Intelligent User Interfaces (IUI), pp. 244-246, 2004.

Smith, Steve; "Tapping the Feed: in search of an RSS Money Trail" Econtent; Mar. 2005; vol. 28, Issue 3; p. 30-34.

Krol, Carol; "RSS ad programs feed needs" B to B; Jul. 11, 2005; vol. 90 Issue 9; p. 1-33.

The Case for a Hybrid P2P Search Infrastructure, Feb. 26, 2004, http://www.cs.berkeley.edu/~boonloo/research/pier/casehybrid_iptps.ppt.

Beverly Yang et al., "Designing a Super-Peer Network," 19th International Conference on Data Engineering (ICDE'03), Mar. 5-8, 2003.

Alexander Pretschner et al., "Ontology Based Personalized Search," (article), Nov. 8-10, 1999, p. 391, Proceedings of the 11th IEEE International Conference on Tools with Artificial Intelligence.

T. Srinivasan et al., "OPSHNN: Ontology Based Personalized Searching Using Hierarchical Neural Networks Evidence Combination," (article), Sep. 2006, pp. 44-44, The Sixth IEEE International Conference on Computer and Information Technology 2006.

Breen, Casey, et al., "Image Classification Using Neural Networks and Ontologies," (article), Sep. 2-6, 2002, pp. 98-102, IEEE Computer Society, Proceedings of the 13th International Workshop on Database and Expert Systems Applications.

Wallapak Tavanapong, "Shot Clustering Techniques for Story Browsing," IEEE Transactions on Multimedia, vol. 6, No. 4, Aug. 2004, pp. 517-527.

Belle L. Tseng et al., "Using MPEG-7 and MPEG-21 for Personalizing Video," IEEE Multimedia, Jan.-Mar. 2004, pp. 45-52.

Zhu et al., "Hierarchical video content description and summarization using unified semantic and visual similarity". Multimedia Systems 9(1). Jul. 2003, p. 31-53.

Press Releases Comverse, http://www.comverse.com/press_releases.aspx?newsId=412, accessed May 17, 2007.

Press Releases Comverse, http://www.comverse.com/press_releases.aspx?newsId=412, accessed Mar. 26, 2007.

Personalise Skype—Invent Yourself, http://skype.klonies.com/studio.php, accessed May 17, 2007.

Gravatar—Globally Recognized Avatars, http://site.gravatar.com/, accessed May 17, 2007.

Cyworld, http://us.cyworld.com/main/index.php, accessed May 17, 2007.

Youniversal Branding, http://www.trendwatching.com/trends/YOUNIVERSALBRANDING.htm, accessed May 17, 2007.

Youniversal Branding, http://www.trendwatching.com/trends/YOUNIVERSALBRANDING.htm, accessed Mar. 26, 2007.

Avatars—Yahoo! Messenger, http://messenger.yahoo.com/avatars.php, accessed May 17, 2007.

Cyworld, http://us.cyworld.com/main/index.php, accessed Mar. 26, 2007.

Personalise Skype—Invent Yourself, http://skype.klonies.com/studio.php, accessed Mar. 26, 2007.

Gravatar—Globally Recognized Avatars, http://site.gravatar.com/, accessed Mar. 26, 2007.

Luskwood Creatures, http://www.luskwood.com/index.htm, accessed Mar. 26, 2007.

Luskwood Creatures, http://www.luskwood.com/index.htm, accessed May 17, 2007.

MySpace, http://www.myspace.com, accessed May 31, 2007.

Pandora Radio, http://www.pandora.com, accessed May 31, 2007.

Rhapsody—Free access to millions of songs online, http://www.rhapsody.com/home.html, accessed May 31, 2007.

Avatars—Yahoo! Messenger, http://messenger.yahoo.com/avatars.php, accessed Mar. 26, 2007.

* cited by examiner

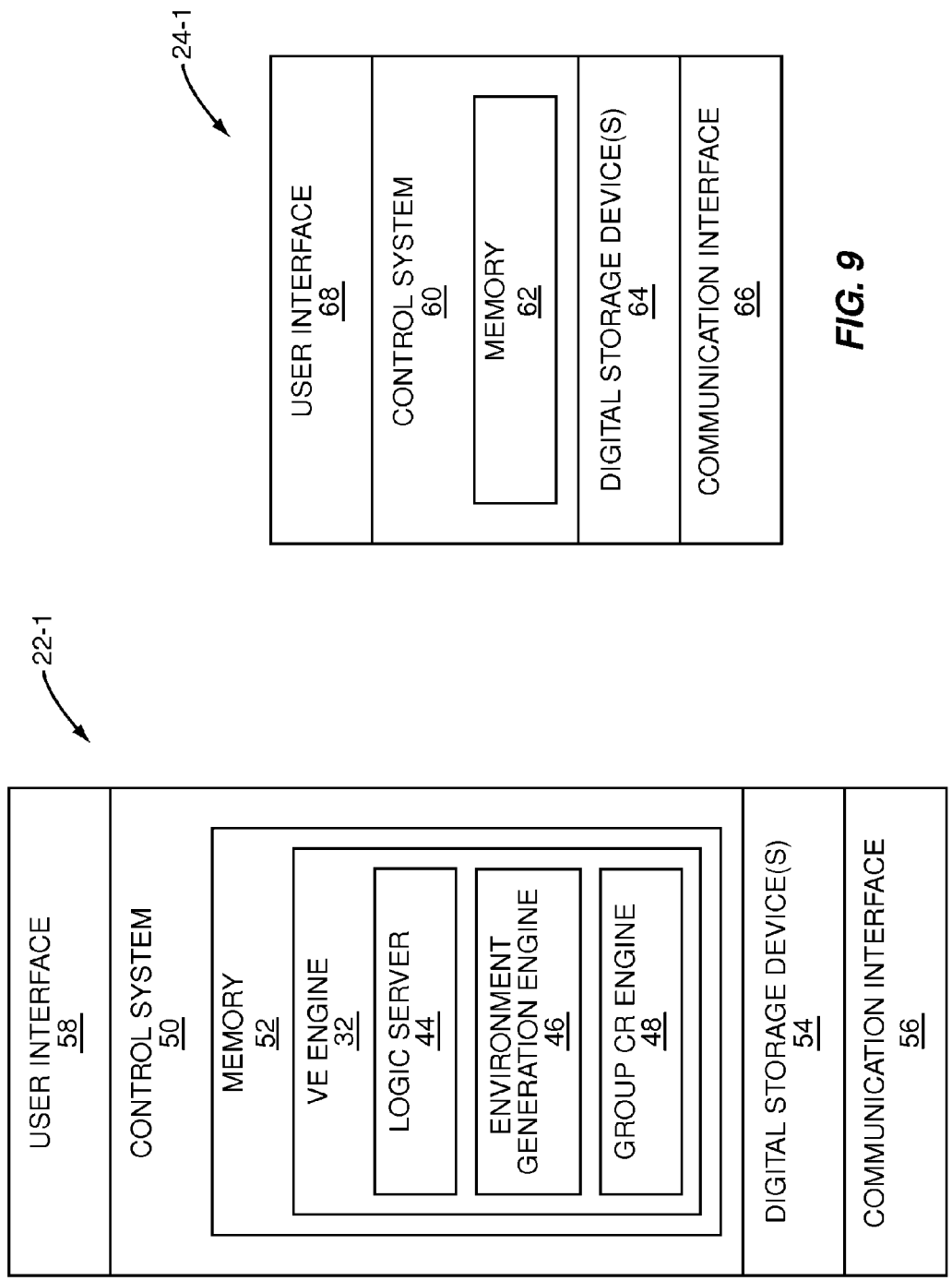

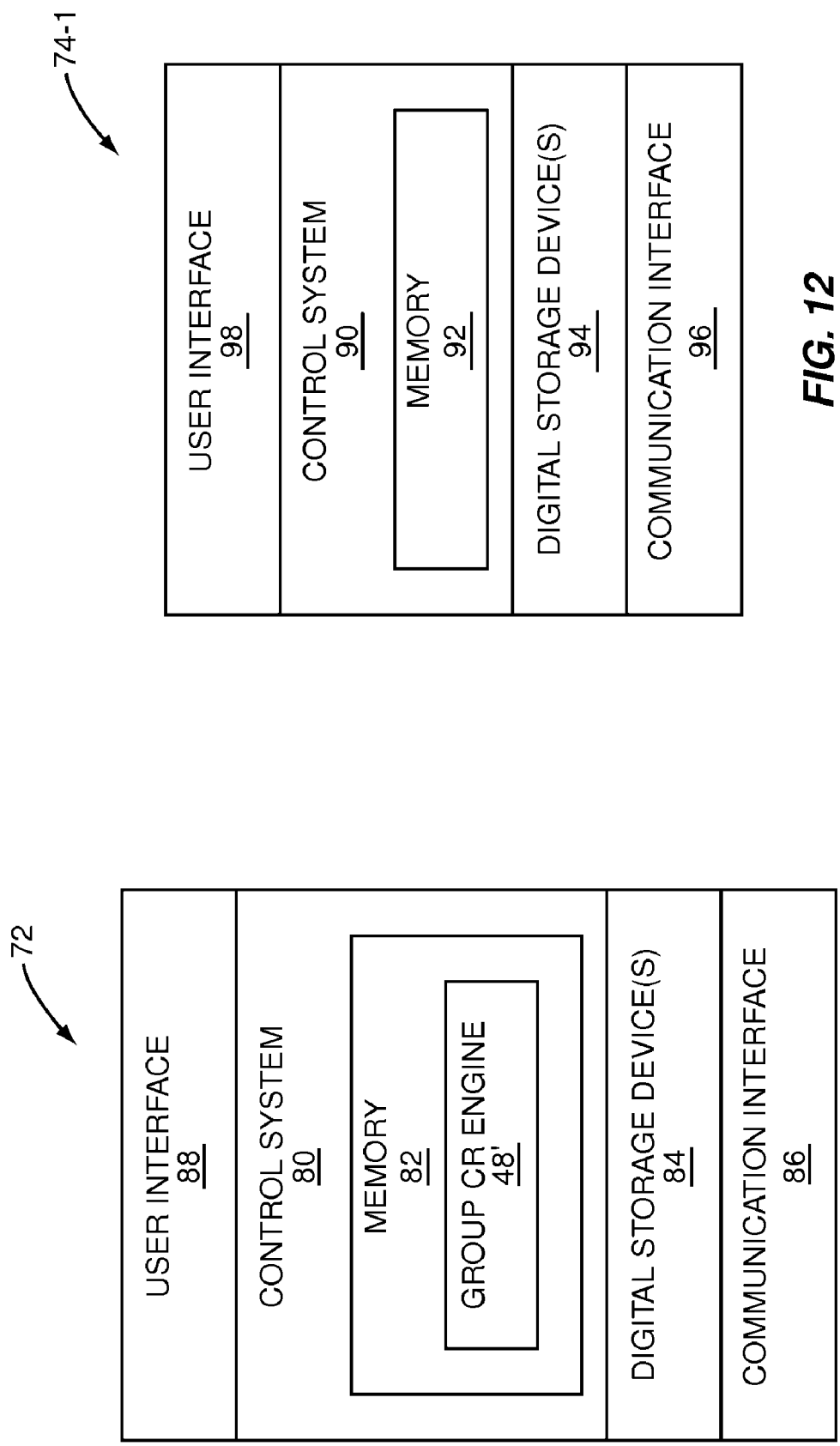

GROUP CONTENT REPRESENTATIONS

RELATED APPLICATIONS

This application is a Continuation-in-Part of U.S. patent application Ser. No. 11/678,781, entitled SYSTEM AND METHOD FOR REPRESENTING CONTENT, which was filed on Feb. 26, 2007 and is hereby incorporated herein by reference in its entirety.

FIELD OF THE INVENTION

The present invention relates to a system and method for providing content representations indicative of content shared by or otherwise made accessible by a group of hosts.

BACKGROUND OF THE INVENTION

There are many communication environments where users interact with each other and, as part of the interaction, share content. These environments include, for example, gaming, virtual worlds, online content sharing or social networking sites, and the like. One issue with these environments is that shared content is not portrayed in a way that is intuitive for content sharing. Users must often dive deep into content folders or user profiles only to discover that the content is of no interest. Thus, there is a need for a system and method for representing content shared or otherwise made available in such environments in a manner that enables users to intuitively identify other users having content of interest.

SUMMARY OF THE INVENTION

The present invention provides a system and method for representing content made accessible by a group of users. In general, a group content representation that is descriptive of content made accessible by the group of users is presented to an interested user. In one embodiment, the users are represented by avatars in a virtual environment, and the group content representation is presented in a view of the virtual environment provided to the interested user. The group content representation may be presented at a fixed or dynamic location within the virtual environment. For example, the group content representation may be presented at a location relative to the avatars representing the group of users in the virtual environment. Based on the group content representation, the interested user is enabled to quickly and easily determine whether content of interest is accessible from the group of users.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 3:
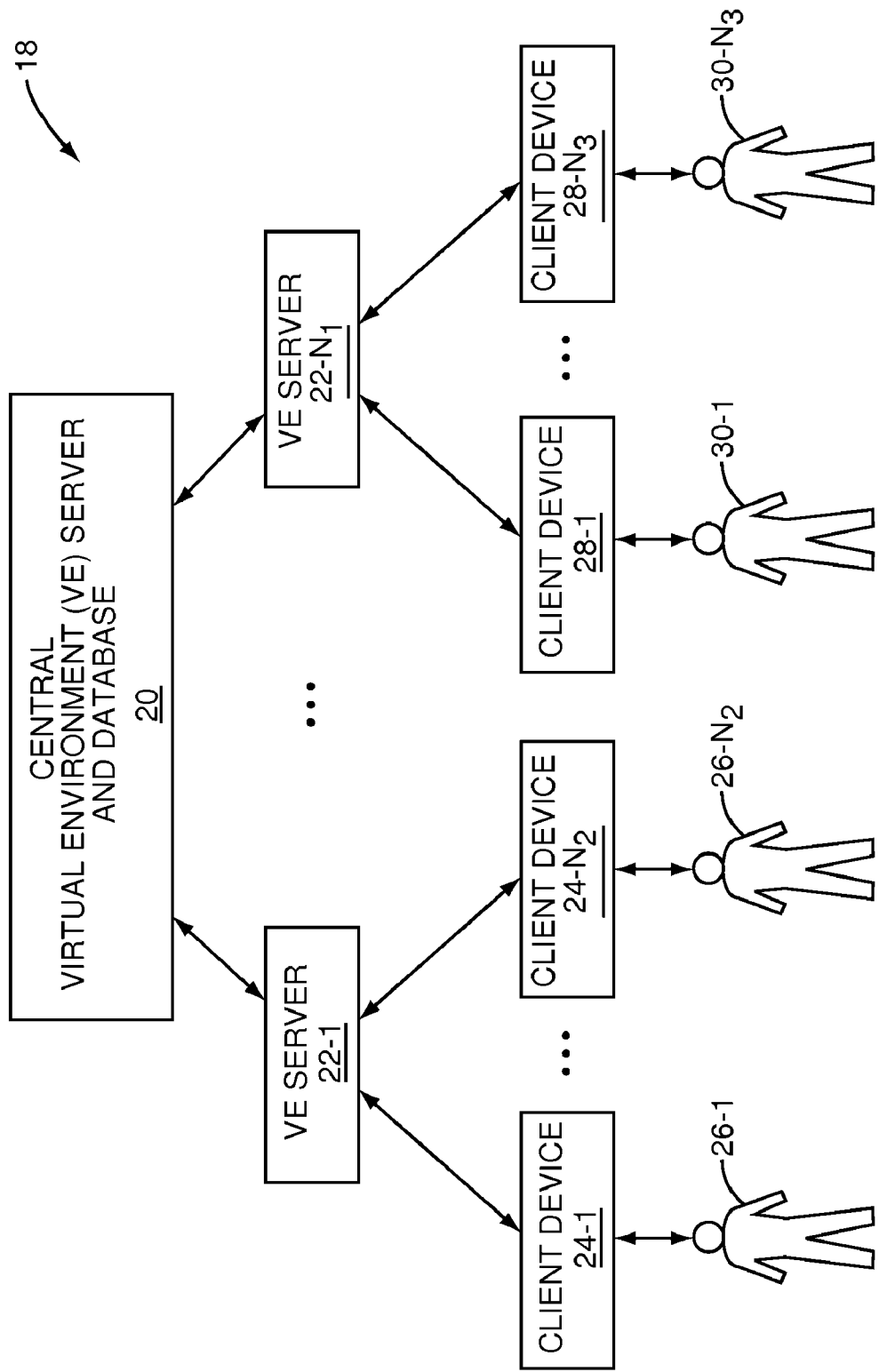
FIG. 3 illustrates a system for implementing a virtual environment according to one embodiment of the present invention.
Figure 7A:
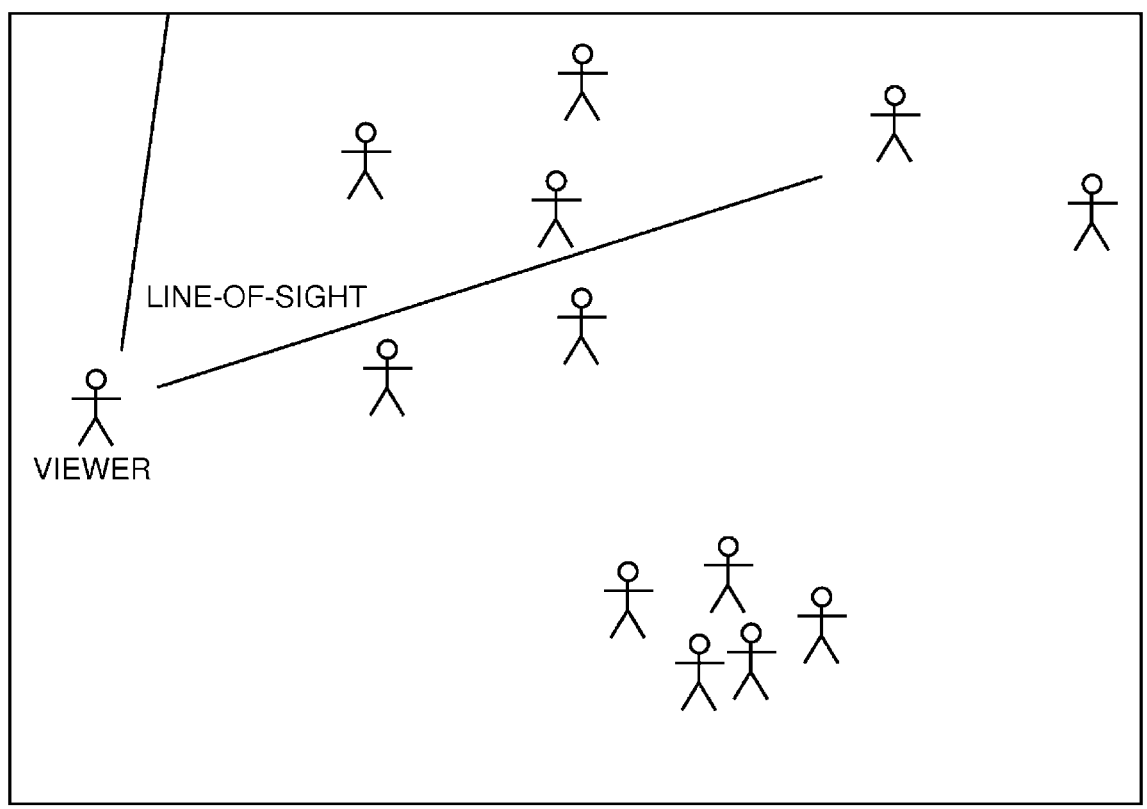
Figure 7B:
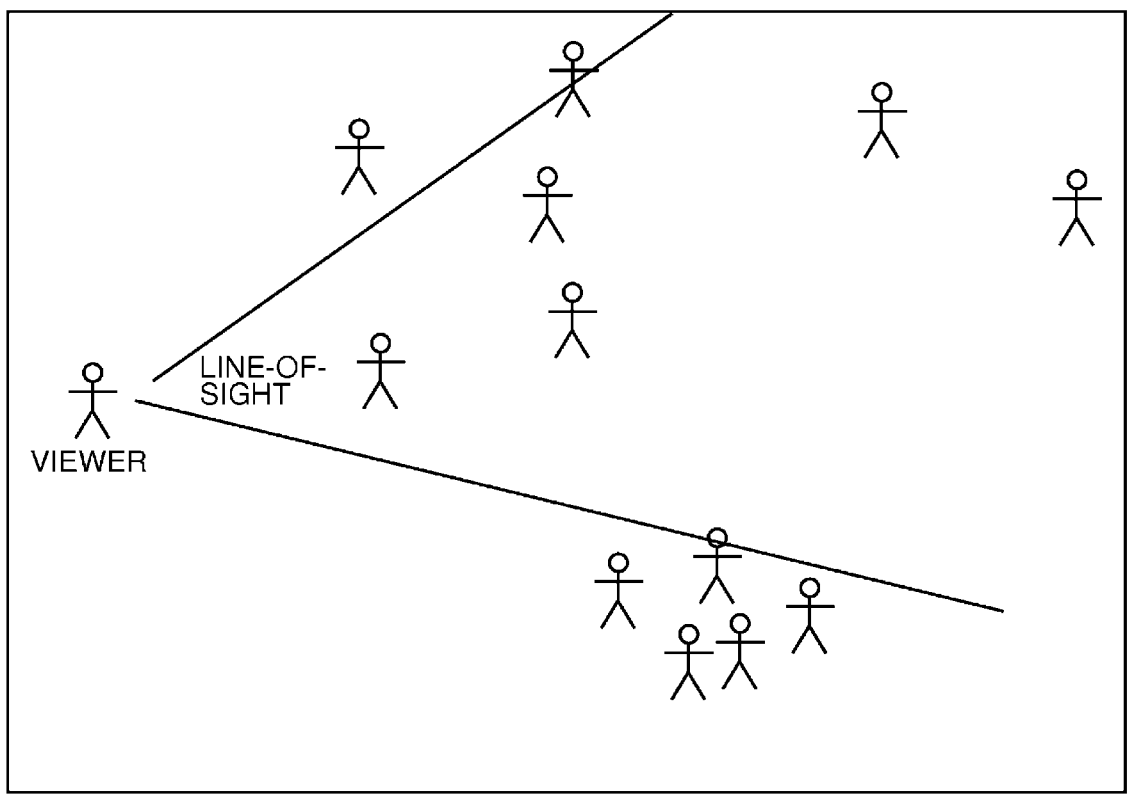
Figure 7C:
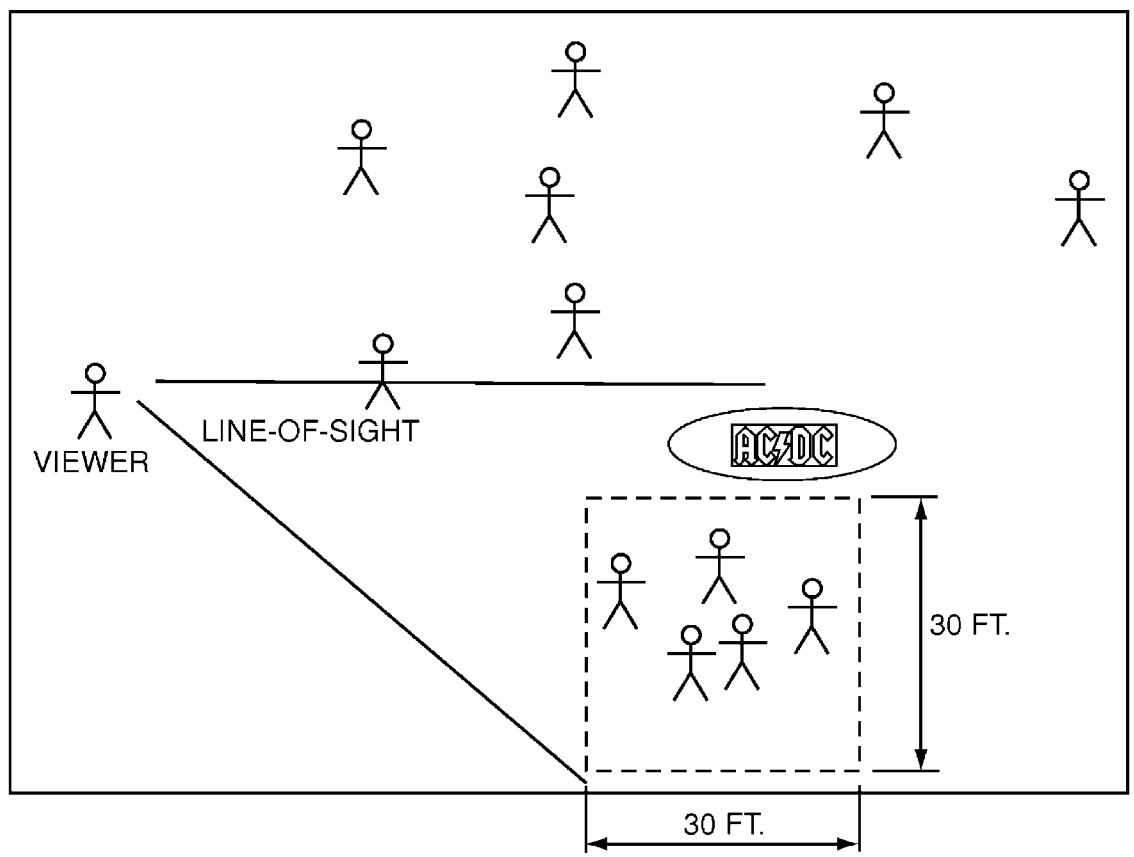
Figure 10:
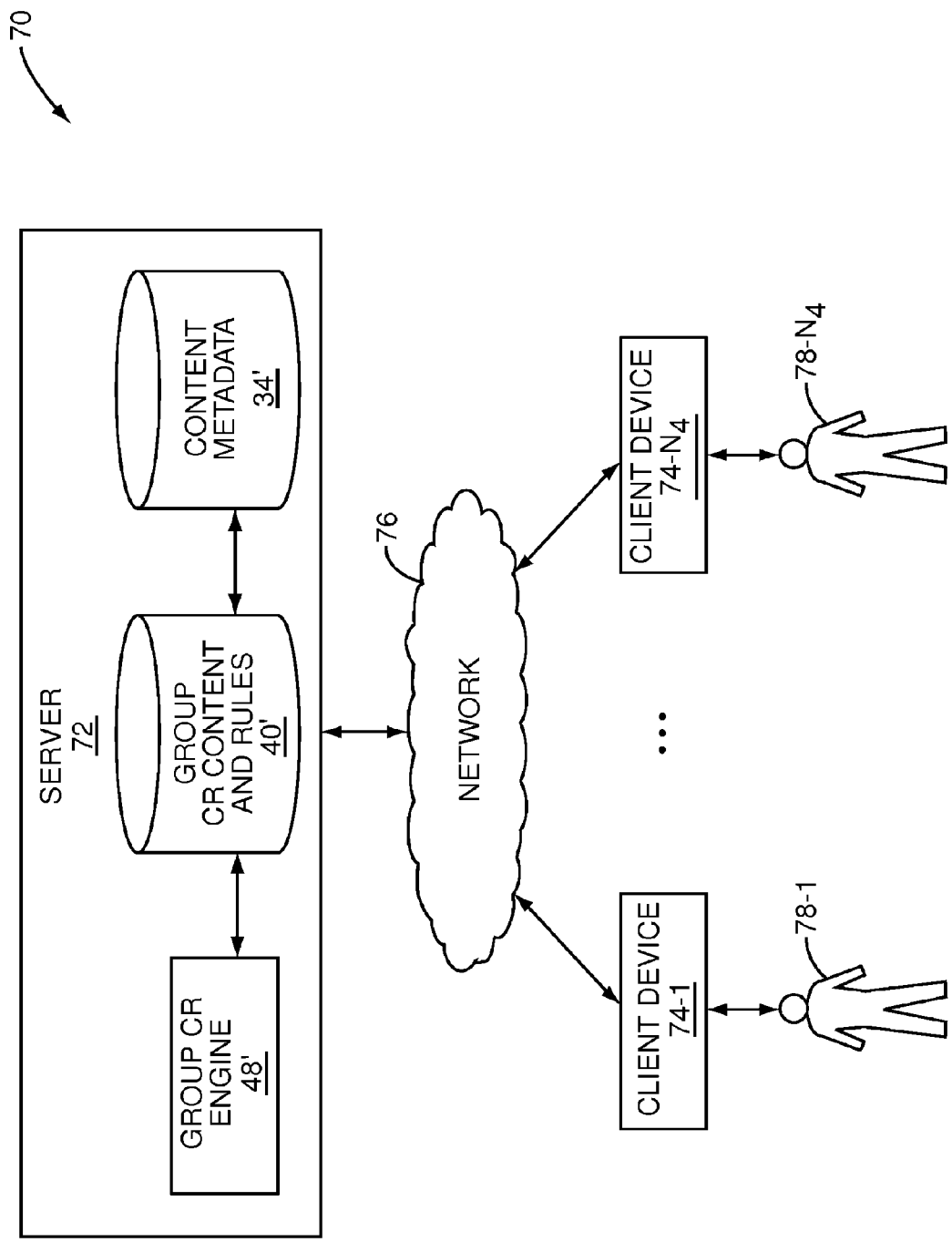

FIGS. 7A-7C graphically illustrate an exemplary process for identifying participants for a group and presenting a group content representation in association with avatars representing the group of participants in a virtual environment according to one embodiment of the present invention;

FIG. 8 is a block diagram of one of the virtual environment servers of FIG. 3 according to one embodiment of the present invention;

FIG. 9 is a block diagram of one of the client devices of FIG. 3 according to one embodiment of the present invention;

FIG. 10 illustrates a system incorporating a group content representation engine according to another embodiment of the present invention;

FIG. 11 is a block diagram of the server of FIG. 10 according to one embodiment of the present invention; and FIG. 12 is a block diagram of one of the client devices of FIG. 10 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1B:
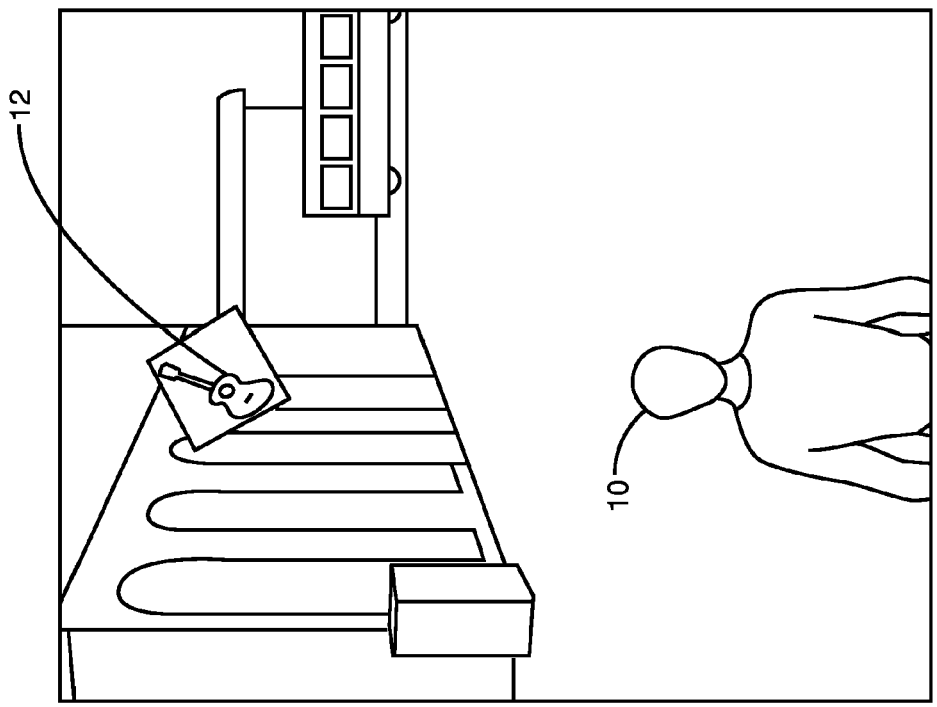
FIGS. 1A and 1B illustrate a fixed group content representation within a virtual environment according to one embodiment of the present invention.
Figure 1A:
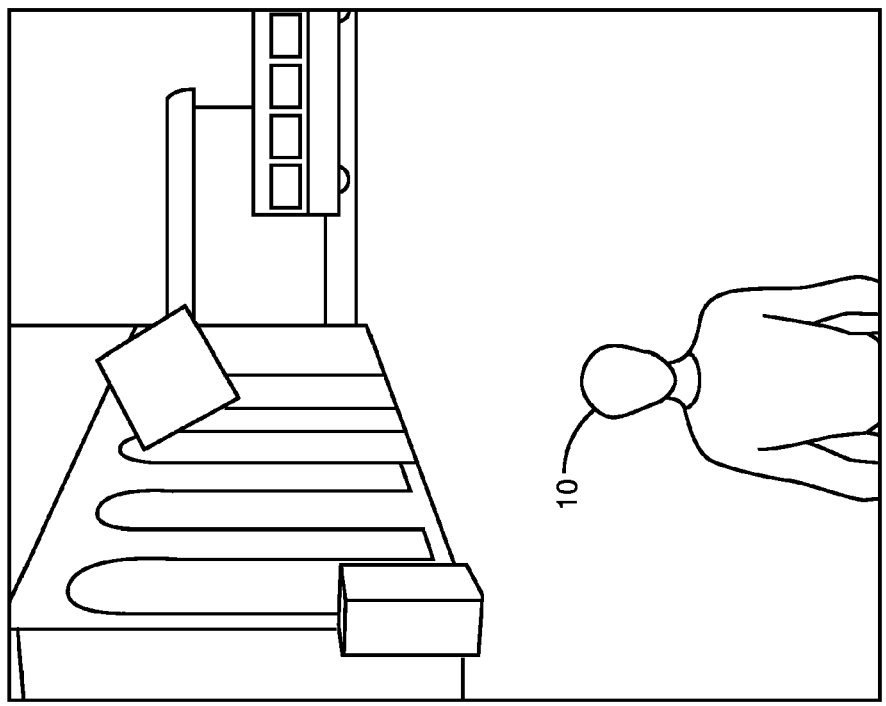

FIGS. 1A and 1B illustrate the concept of a group content representation according to one embodiment of the present invention. It should be noted that while much of the following discussion focuses on group content representations in a virtual environment such as, for example, a virtual world or Massively Multiplayer Online Role Playing Game (MMORPG) where users are represented by avatars within the virtual environment, the present invention is not limited thereto.

FIG. 1A illustrates a view of an exemplary virtual environment provided to a user represented by an avatar 10. FIG. 1B illustrates the same view of the virtual world including a group content representation 12 according to one embodiment of the present invention. In this embodiment, the group content representation 12 is what is referred to herein as a static group content representation that is presented at a fixed location within the virtual environment. In this example, the fixed location is on a sign located outside of a building. Note that while the sign is also illustrated in FIG. 1A, the sign may or may not exist without the group content representation 12. The group content representation 12 is descriptive of content shared or otherwise made accessible by users represented by avatars located within the building and/or content shared or otherwise may accessible by virtual objects located within the building.

Figure 2:
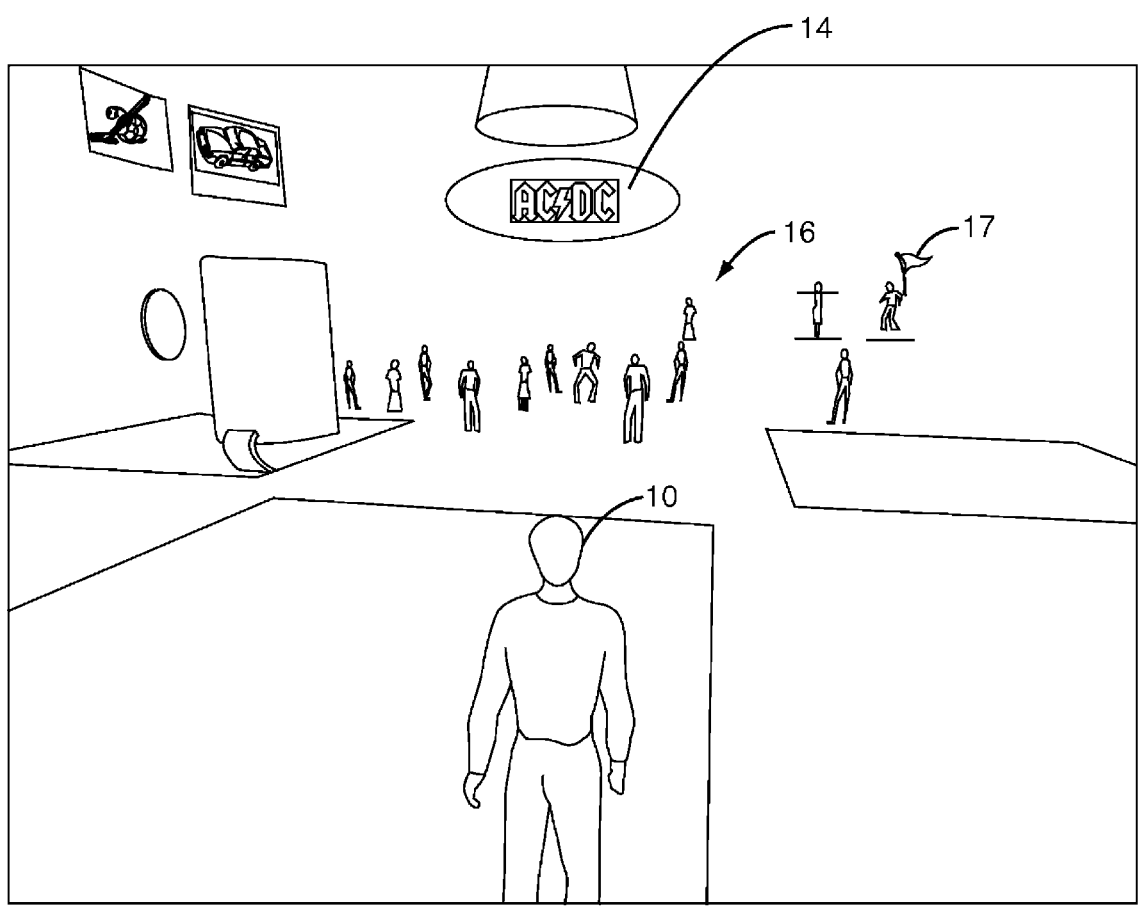
FIG. 2 illustrates a dynamic group content representation within a virtual environment according to another embodiment of the present invention.

FIG. 2 illustrates a dynamic group content representation 14 according to one embodiment of the present invention. As used herein, a dynamic group content representation is a group content representation that is presented at a dynamic location within the virtual environment. Here, the dynamic group content representation 14 is presented within the view of the virtual environment provided to the user represented by the avatar 10. The dynamic group content representation 14 is presented at a dynamic location that is relative to the location of a group of avatars 16 and is descriptive of content shared or otherwise made accessible by users represented by the group of avatars 16. Note that some indicia, such as a flag 17, may be presented in association with one or more avatars representing key users or participants in the group. For example, the key users or participants may be those users or participants that share or otherwise make accessible content that is most relevant to the dynamic group content representation 14 and/or preferences of the user represented by the avatar 10. The indicia, such as the flag 17, may also be indicative of an amount of content made accessible by the associated user. In another embodiment, the avatars of the participants in the group may include indicia of the amount of content related to the dynamic group content representation 14 and/or types of content made accessible by the participants.

FIG. 3 illustrates an exemplary embodiment of a system 18 providing a virtual environment in which group content representations are implemented according to one embodiment of the present invention. It should be noted that the system 18 of FIG. 3 is exemplary and not intended to limit the scope of the present invention. The virtual environment may be any type of virtual environment. For example, the virtual environment may be a virtual world such as, for example, Second Life or a virtual gaming environment such as a MMORPG. In addition, while one embodiment of the system 18 is discussed below, the system 18 may implement the virtual environment in a centralized or distributed fashion.

In general, the system 18 includes a central virtual environment (VE) server and database 20 and a number of distributed VE servers 22-1 through 22-$N_1$. The VE server 22-1 serves a number of client devices 24-1 through 24-$N_2$ having associated users 26-1 through 26-$N_2$. Likewise, the VE server 22-$N_1$ serves a number of client devices 28-1 through 28-$N_3$ having associated users 30-1 through 30-$N_3$. The central VE server and database 20 and the distributed VE servers 22-1 through 22-$N_1$ may be connected by any type of network, where the network may include wired components, wireless components, or both wired and wireless components. The VE servers 22-1 through 22-$N_1$ are connected to the associated client devices 24-1 through 24-$N_2$ and 28-1 through 28-$N_3$ by any type of network, where the network may include wired components, wireless components, or both wired and wireless components. This network may or may not be the same network as that connected the central VE server and database 20 and the VE servers 22-1 through 22-$N_1$.

The central VE server and database 20 manages user accounts and may also manage overall game logic and the like. The VE servers 22-1 through 22-$N_1$ manage interactions and user events and provide a client specific view of the virtual environment to the client devices 24-1 through 24-$N_2$ and 28-1 through 28-$N_3$. The client devices 24-1 through 24-$N_2$ and 28-1 through 28-$N_3$ may be, for example, personal computers, mobile devices such as mobile telephones or Personal Digital Assistants (PDAs), game consoles, or the like and generally include either a custom software application or a web browser enabling interaction with the VE servers 22-1 through 22-$N_1$ for participation in the virtual environment.

Note that in an alternative embodiment, the operation of the central VE server and database 20 and optionally the VE servers 22-1 through 22-$N_1$ may be distributed among the other devices in the system 18. For example, the operation of the central VE server and database 20 may be distributed among the VE servers 22-1 through 22-$N_1$. As another example, the operation of the central VE server and database 20 and the VE servers 22-1 through 22-$N_1$ may be distributed among the client devices 24-1 through 24-$N_2$ and 28-1 through 28-$N_3$.

According to one embodiment of the present invention, the users 26-1 through 26-$N_2$ and 30-1 through 30-$N_3$ are represented by avatars in the virtual environment. An avatar is, for example, a representation of a user in the form of a three-dimensional model, a two-dimensional icon, or the like. As discussed below in more detail, in order to enable, for example, the user 26-1 to locate others of the users 26-2 through 26-$N_2$ and 30-1 through 30-$N_3$ sharing or otherwise making accessible content of interest to the user 26-1, the system 18 effects presentation of group content representations in the client view of the virtual environment provided to the user 26-1 at the client device 24-1. As discussed below, a group content representation may be a fixed group content representation at a fixed location within the virtual world or a dynamic group content representation having a dynamic location within the virtual world. Dynamic group content representations are generally presented in association with groups of the avatars of the users 26-1 through 26-$N_2$ and 30-1 through 30-$N_3$. It should be noted that the groups are not limited to avatars. The groups may additionally or alternatively include other virtual objects in the virtual environment that share content or otherwise make content accessible to the users 26-1 through 26-$N_2$ and 30-1 through 30-$N_3$.

Whether a group content representation is presented at a fixed location or a dynamic location, a group content representation is descriptive of content shared by or otherwise made accessible by users represented by avatars within a defined location or area of the virtual environment. More specifically, a group content representation is descriptive of the aggregate of content shared or otherwise made accessible by a group of participants such as group of the users 26-1 through 26-$N_2$ and 30-1 through 30-$N_3$. The content may be audio content such as songs or music; video content such as movies, television programs, or video clips; pictures; virtual objects such as weapons, clothing, or food; user profiles; or the like. While this disclosure focuses on the aforementioned types of content, the present invention is not limited thereto. The content may additionally or alternatively be any other type of digital content such as, for example, user profiles, activities or interaction events in the virtual environment such as instant messages, hobbies, or the like. Thus, for example, a group content representation may be indicative of content type such as music, video, picture, or the like; genre such as music genre, movie genre, or television program genre; artist such as music artist, actor, or actress; time period of release; acoustic styles; keywords; or the like. In addition, the group content representation may be indicative of content quality, quantity of content, availability or accessibility, copyright or Digital Rights Management (DRM) restriction, a source or sources of the content, or the like or any combination thereof.

Note that the content made accessible by the users 26-1 through 26-$N_2$ and 30-1 through 30-$N_3$ is generally hosted by the client devices 24-1 through 24-$N_2$ and 28-1 through 28-$N_3$. However, the content may alternatively be hosted by, for example, the central VE server and database 20, one or more of the VE servers 22-1 through 22-N₁, a third party server such as a server providing a centrally hosted content sharing service, a P2P content sharing service, or the like or any combination thereof.

Figure 4:
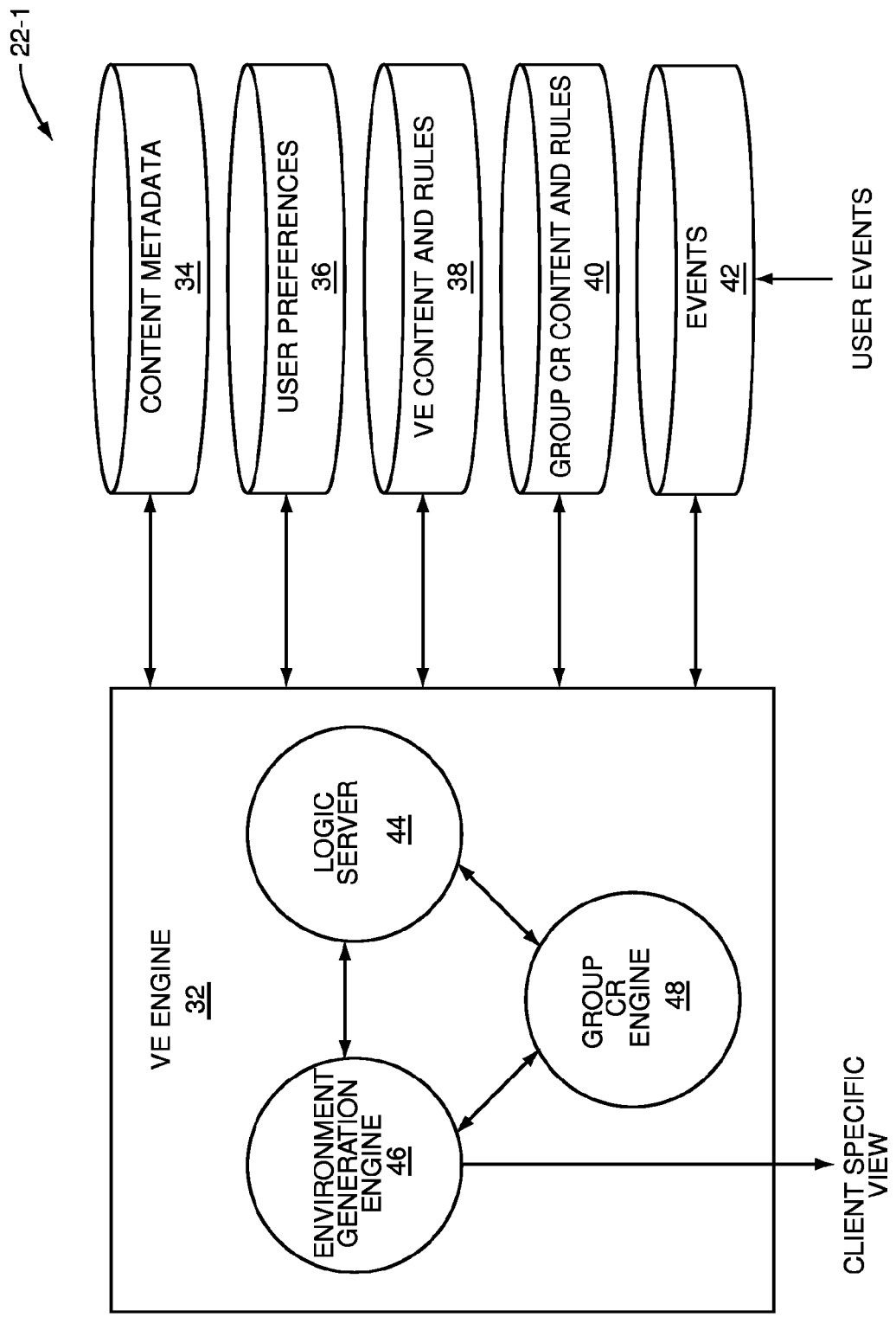
FIG. 4 is a more detailed illustration of one of the virtual environment servers of FIG. 3 where the virtual environment server includes a group content representation engine according to one embodiment of the present invention.

FIG. 4 illustrates the VE server 22-1 according to one embodiment of the present invention. This discussion is equally applicable to the other VE servers 22-2 through 22-N₁. As illustrated, the VE server 22-1 includes a VE engine 32 and a number of databases 34-42. The databases 34-42 include a content metadata database 34, a user preferences database 36, a VE content and rules database 38, a group content representation (CR) content and rules database 40, and an events database 42. In this embodiment, the content metadata database 34 includes content metadata describing content items shared by or otherwise made accessible by each of the users 26-1 through 26-N₂ and 30-1 through 30-N₃ (FIG. 3). As used herein, a content item is a song, movie, television program, video clip, picture, virtual object, user profile, or the like. The content metadata may vary depending on the type of content item. For example, for each song, the content metadata may include the title of the song, the album on which the song was released, the artist of the song, the release date of the song, genre or classification, information defining the quality of the song such as the encoding parameters used to encode the song, DRM or copyright restrictions, rating, user comments, or the like. In addition, the content metadata may include availability or accessibility information such as information reflecting a connection speed of the associated client device hosting the song, estimated download time, a reference or Uniform Resource Locator (URL) providing access to the associated content, or the like.

The user preferences database 36 stores user preferences for each of the users 26-1 through 26-N₂ and 30-1 through 30-N₃. The user preferences may include, for example, one or more preferred types of content; one or more preferred genres such as one or more preferred music genres, movie genres, or television program genres; one or more preferred time periods; one or more other classifications of content; one or more preferred artists such as one or more preferred music artists, actors, or actresses; one or more preferred acoustic styles; a preferred quality level or preferred range of quality levels; one or more preferred availability or accessibility parameters such as a preferred connection speed or estimated download time; a preferred quantity of content to be available from a host before a corresponding content representation is presented to the user; and preferred DRM or copyright restriction parameters. The VE content and rules database 38 stores content and rules required for the operation of the virtual environment.

The group CR content and rules database 40 stores graphics or information corresponding to the group content representations and associated rules defining when the group content representations are applicable. As discussed below, in one embodiment, the group CR content and rules database 40 is an ontology where each node in the ontology is a content descriptor and is associated with one or more content representations and one or more rules defining when the content representations are applicable. The ontology, including the nodes of the ontology, the content representations associated with the nodes of the ontology, and the rules for the nodes of the ontology, may be defined by an operator of the system 18, based on contributions from the users 26-1 through 26-N₂ and 30-1 through 30-N₃, or the like or any combination thereof. Note that while an ontology is discussed herein, any similar data structure such as a linked list, taxonomy, or the like may be used.

The events database 42 stores incoming user events from the client devices 24-1 through 24-N₂. The user events may be any user event permitted in the virtual environment. For example, the user event may be related to movement of a user's avatar within the virtual environment or entry of the avatar into the virtual environment.

The VE engine 32 may be implemented in software, hardware, or a combination thereof. In general, the VE engine 32 operates to provide a client specific view of the virtual environment to each of the client devices 24-1 through 24-N₂ based on user events received from the client devices 24-1 through 24-N₂. The VE engine 32 includes a logic server 44, an environment generation engine 46, and a group content representation (CR) engine 48. Using the VE content and rules database 38, the logic server 44 and the environment generation engine 46 operate to process user events from the client devices 24-1 through 24-N₂ and provide client specific views of the virtual environment to the client devices 24-1 through 24-N₂. Using the group CR content and rules database 40, the group CR engine 48 interacts with the logic server 44 and the environment generation engine 46 to effect presentation of group content representations within the virtual environment according to the present invention.

Figure 5:
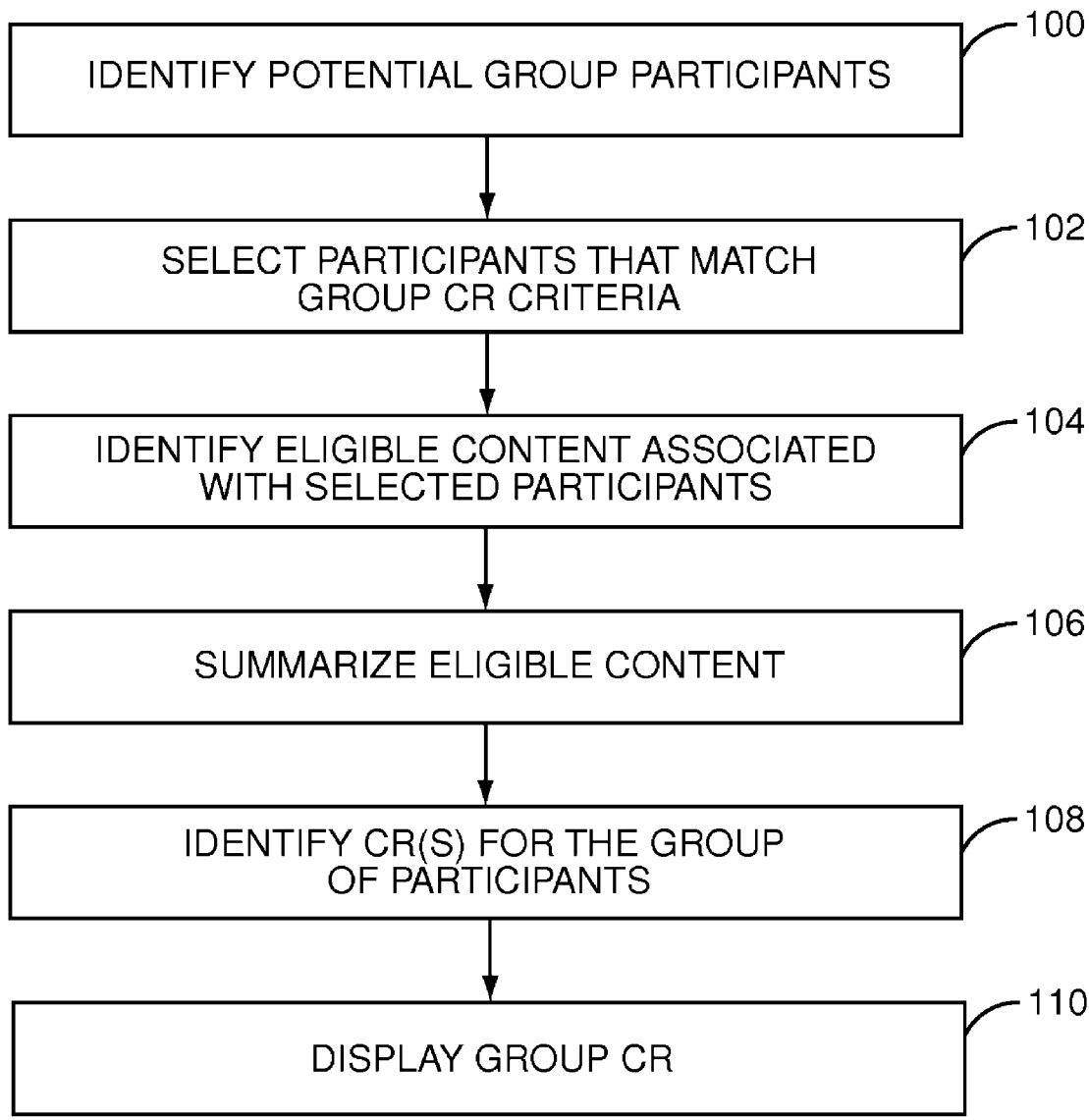
FIG. 5 illustrates the operation of one of the virtual environment servers according to one embodiment of the present invention.

FIG. 5 illustrates the operation of the VE engine 32 and particularly the operation of the group CR engine 48 to effect presentation of group content representations in the virtual environment. In this example, the group CR engine 48 effects presentation of a group content representation to the user 26-1. First, the group CR engine 48 identifies potential participants for a group content representation (step 100). The potential participants are typically users represented by avatars in the virtual environment. However, the potential participants may also include other virtual objects sharing content or otherwise making content accessible within the virtual environment.

In one embodiment, the group content representation to be presented is a fixed group content representation. As used herein, a fixed group content representation is a group content representation to be presented in a particular or fixed location in the virtual environment such as, for example, a sign outside of a building. An example of a fixed group content representation is illustrated in FIG. 1B, which was discussed above. More specifically, in one embodiment, a fixed group content representation has the following attributes: a location, a boundary, area inclusion/exclusion attributes, participation rules, visibility rules, display properties, and content preferences. The attributes may be defined by the central VE server and database 20, the VE server 22-1, or one of the users 26-1 through 26-N₂ or 30-1 through 30-N₃.

The location of the fixed group content representation defines a position and optionally size of the group content representation within the virtual environment. The boundary defines an outer limit of a defined area of the virtual world where avatars within the area are or may be identified as the potential participants for the fixed group content representation. The boundary may be defined by a radius from a central location. The central location may or may not be the location of the fixed group content representation. The boundary may alternatively be defined as, for example, a collection of points within the virtual environment, a building within the virtual environment, a room within a building in the virtual environment, or the like. The area of inclusion/exclusion attributes may further refine the defined area for the group content representation such that one or more types of areas within the virtual environment and within the boundary are either included or excluded from the defined area. For example, certain areas within the virtual environment may be public or private locations. As such, an exclusion attribute may be defined such that private areas within the boundary are excluded if the interested user, which is the user 26-1, does not have access to the private area. Thus, if the user 26-1 does not have access to a private location within the boundary such as a private room in a building, then the avatars within the private location are not identified as potential participants for the group content representation.

The participation rules provide the ability to include or exclude users or their avatars from a group. In addition, the participation rules may provide the ability to include or exclude virtual objects making content accessible from the group. As discussed below, the participation rules are used to select participants for the group from the potential group participants. For example, the participation rules may include a desired user rating or range of user ratings. As another example, the participation rules may include a desired social network distance or range between the user 26-1 and the participants in the social network. More specifically, social networks such as the Yahoo! Instant Messenger network, a friend-of-a-friend (FOAF) network, or the like define relationships between users. As such, a participation rule may be defined such that only those potential participants that are within a defined number of hops or degrees from the user 26-1 in the social network are selected as the participants for the group.

As another example, the participation rules may define a desired duration of time that a potential participant must be within the defined area in order to be selected as a participant for the group. As another example, the participation rules may include a rule stating that potential participants must be within a defined actual physical proximity to the user 26-1 before being selected as participants for the group. As another example, the participation rules may be defined such that the client devices of the potential participants must be within a desired distance or number of hops from the client device 28-1 of the user 26-1 within the communication network before being selected as participants for the group. As another example, the participation rules may be defined such that the avatars of the potential participants must be within a desired distance from the avatar of the user 26-1 in the virtual environment before being selected as participants for the group. As another example, the participation rules may include or exclude users or virtual objects from a group based on content items or types of content items made accessible by the users or virtual objects. As a final example, the participation rules may include or exclude users located within a defined area of the real world, where the location of the users may be determined using any appropriate technology such as, for example, Global Positioning System (GPS) technology or the like.

The visibility rules provide the ability to control when the fixed group content representation is displayed. For example, a rule may be defined such that the group content representation is only presented when more than a defined number of participants satisfying the other criteria for the group content representation are within the boundary for the group content representation. As another example, both group content representations and individual content representations may be provided, wherein individual content representations are discussed in U.S. patent application Ser. No. 11/678,781, entitled SYSTEM AND METHOD FOR REPRESENTING CONTENT. A visibility rule may be provided such that individual content representations are not displayed when a group content representation is displayed or such that some indicia is used to distinguish between individual and group content representations. The visibility rules are used to determine whether to display the group content representation, as discussed below.

In one embodiment, the visibility rules may be defined such that the group content representation is what is referred to herein as a perpetual group content representation. A perpetual group content representation is preferably a dynamic group content representation that is always presented to the interested user. As an example, a perpetual group content representation may always be presented in the view of the virtual environment provided to the user 26-1 as the user moves about the virtual environment, where the perpetual group content representation is descriptive of the content shared or otherwise made accessible by users represented by avatars within the defined area, if any. If there are no participants satisfying the criteria for the group, then the group content representation may be some corresponding indicia, such as "Not Available."

The display properties may include group-specific display properties such as, for example, how to distinguish key participants in the group. The key participants may be, for example, users sharing or making accessible content that is most closely related to the group content representation selected for display and/or the user preferences of the user 26-1. The display properties are used when displaying the group content representation, as discussed below. As another example, the display properties may provide that some indicia of the amount of content contributed by each participant in the group be displayed.

The content preferences may be used in addition to or as an alternative to the user preferences and may include, for example, information identifying one or more preferred content types, one or more preferred genres, artists, time periods, or the like. The content preferences may additionally or alternatively include a preferred content quality, preferred availability, or the like.

In another embodiment, the group content representation to be presented is a dynamic group content representation. As used herein, a dynamic group content representation is not fixed to a specific location in the virtual environment. An example of a dynamic group content representation is illustrated in FIG. 2, which was discussed above. Similar to a fixed group content representation, a dynamic group content representation has the following attributes: a location, a boundary, area inclusion/exclusion attributes, participation rules, visibility rules, display properties, and content preferences. In addition, the dynamic group content representation may have a user boundary and a user density attribute.

With respect to a dynamic group content representation, the location is a relative location with respect to the associated group. Thus, for example, the location may be defined by a vertical and horizontal distance relative to a central point of a group of avatars. The boundary defines an area of the virtual environment in which potential participants for the group content representation are identified. For example, the boundary may be a defined radius about the avatar of the user 26-1. As another example, the boundary may be defined by the line-of-sight of the avatar of the user 26-1. The line-of-sight may be limited by a proximity setting such as a maximum distance from the avatar of the user 26-1. The area of inclusion/exclusion attributes may further refine the defined area for the group content representation. For example, users represented by avatars within a private area of the virtual environment that is otherwise within the defined area for the group content representation may be excluded from the group if the user 26-1 does not have access to the private area. As discussed above with respect to the fixed group content representation, the participation rules, the visibility rules, the display properties, and the content preferences may also be used with respect to dynamic group content representations.

In addition, the user boundary attribute may, for example, provide that participants for the group are to be within some defined area relative to one another. For example, the user boundary may state that the participants for the group are to be within a 30 foot (ft) square area or a circular area having a radius of 15 ft within the area defined by the boundary of the group content representation. In addition or alternatively, the user density attribute may define a threshold density of participants for the user boundary or the boundary for the group content representation that must be met before displaying the group content representation. The threshold density may be a threshold number of participants within the user boundary or the boundary of the group content representation, a threshold number of participants per square foot, or the like.

Thus, whether the group content representation is fixed or dynamic, the group CR engine 48 identifies the potential participants for the group based on boundary and area inclusion/exclusion attributes defining an area of the virtual environment associated with the group content representation. Any avatars or other virtual objects sharing content or otherwise making content available that are within the defined area for the group content representation are identified as the potential participants for the group.

After identifying the potential participants for the group, the group CR engine 48 selects participants for the group from the identified potential participants based on the criteria defined by the attributes of the group content representation (step 102). In one embodiment, the participants are selected from the potential participants based on the participation rules. In addition, the content preferences, the preferences of the user 26-1, and/or user profiles describing the preferences of the user 26-1 and the potential participants may be considered. Alternatively, all of the potential participants may be identified or selected as the participants for the group.

In an alternative embodiment, rather than the group CR engine 48 identifying the potential participants and selecting the participants for the group from the potential participants, the participants of the group content representation may be manually defined or selected by the user 26-1. For example, the user 26-1 may interact with the client device 24-1 to highlight or otherwise select a number or group of avatars within the virtual environment, thereby identifying the participants for the group content representation. As another example, the user 26-1 may define a list of participants for a group content representation. Thereafter, the group content representation may be presented to the user 26-1 when, for example, the avatars of one or more of the participants are proximate to or within some defined area around the avatar of the user 26-1, the avatars of one or more of the participants are within the defined area associated with the group content representation, or the like. As a final example, the potential participants may be automatically identified as users related to the user 26-1 within N levels in a social network.

Once the participants for the group are selected, the group CR engine 48 identifies eligible content shared by or otherwise made accessible by the selected participants (step 104). In one embodiment, the content metadata describing the content shared or otherwise made accessible by the selected participants is compared to the content preferences for the group content representation, where only the content matching or substantially matching the content preferences is identified as the eligible content for the group content representation. Alternatively, all of the content shared or otherwise made accessible by the selected participants may be identified as the eligible content for the group content representation.

The group CR engine 48 then summarizes or generates a summary of the eligible content shared or otherwise made accessible by the selected participants (step 106). The summary is also referred to herein as aggregate metadata describing the content shared or otherwise made accessible by the selected participants. More specifically, in one embodiment, the group CR engine 48 obtains the metadata describing the eligible content and aggregates the metadata to provide the summary of the eligible content. The summary may include, for example, information identifying each music and/or movie genre for which content items are included in the eligible content and a number of unique content items for each genre, information identifying each music artist for which songs are included in the eligible content and a number of unique songs for each music artist, information identifying a number of keywords or tags applied to images included in the eligible content and a number of unique images for each keyword or tag, and the like.

Note that, in one embodiment, virtual peers may be formed to assist in the collection of metadata describing the content made accessible by the selected participants. For example, a virtual peer may be established for a particular area of the virtual environment such as, for example, a building. As another example, a virtual peer may be established for a dynamic or perpetual group. Note that any other criteria may be used for establishing a virtual peer. A sponsoring agent for the virtual peer may operate to collect the metadata for all content made accessible by avatars or virtual objects within the particular area. Thereafter, the sponsoring agent for the virtual peer may provide the metadata to the VE server 22-1 automatically or upon request. For more information about an exemplary virtual peer, the interested reader is directed to U.S. patent application Ser. No. 11/536,868, entitled VIRTUAL PEER IN A PEER-TO-PEER NETWORK, which was filed on Sep. 29, 2006 and is hereby incorporated herein by reference in its entirety.

Once the summary is generated, the group CR engine 48 identifies one or more applicable group content representations based on the summary of the eligible content (step 108). More specifically, the group CR engine 48 first processes the summary of the eligible content made available by the selected participants for the group based on the group CR rules from the group CR content and rules database 40 (FIG. 4) to determine which of the predefined group content representations are applicable to the eligible content made available by the selected participants. As mentioned above, in one embodiment, the group CR content and rules database 40 includes an ontology or similar data structure providing a defined set of group content representations. Each node in the ontology corresponds to a content descriptor such as, for example, a content type, genre, artist, time period, or the like. Each node has one or more associated content representations and one or more rules defining when the content representation(s) for the node are applicable. Again, while an ontology is discussed herein, any similar data structure such as a linked list, taxonomy, or the like may be used.

Figure 6:
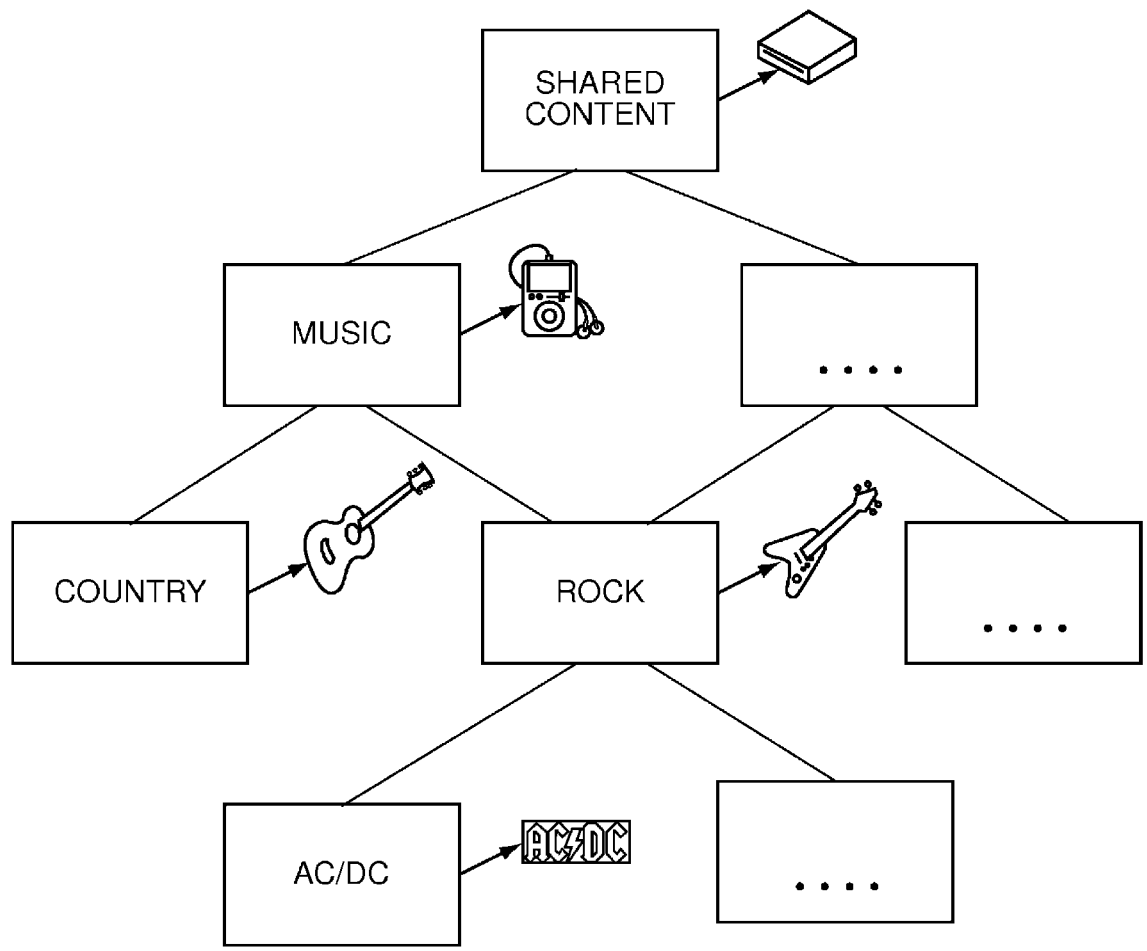
FIG. 6 illustrates an exemplary ontology for identifying group content representations applicable to content shared by a group of participants according to one embodiment of the present invention.

An exemplary ontology is illustrated in FIG. 6. Note that the exemplary ontology of FIG. 6 is for illustrative purposes and not intended to limit the scope of the present invention. As illustrated, the ontology may include a "shared content" node, a "music" node, a "country" node, a "rock" node, an "AC/DC" node, and the like. Each of the nodes has one or more associated group content representations that are indicative of the corresponding node in the ontology. Using this ontology, the summary or aggregate metadata for the eligible content shared or otherwise made accessible by the selected participants may be processed to determine which of the group content representations are applicable to the eligible content. For example, if the aggregate metadata includes metadata for shared music from the Country genre, the rules for the nodes in the ontology may be defined such that the group content representations for the "shared content" node, the "music" node, and the "country" node are all applicable to the eligible content made accessible by the selected participants. If the aggregate metadata also includes metadata for shared music from the Rock genre, the rules for the nodes in the ontology may be defined such that the group content representation for the "rock" node is also applicable to the eligible content made accessible by the selected participants. For example, in order to determine which ontological nodes are applicable, a scoring scheme may be used such as that disclosed in U.S. patent application Ser. No. 11/359,632, entitled METHODS, SYSTEMS, AND PRODUCTS FOR CHARACTERIZING TARGET SYSTEMS, filed Feb. 22, 2006 and U.S. patent application Ser. No. 11/414,021, entitled METHODS, SYSTEMS, AND PRODUCTS FOR CLASSIFYING CONTENT SEGMENTS, filed Apr. 28, 2006, both of which are hereby incorporated herein by reference in their entireties. Note that any other type scoring algorithm may be used.

Additionally or alternatively, the aggregate metadata may include information identifying individual content representations for each of the participants in the group. For more information regarding the generation of individual content representations, the interested reader is directed to U.S. patent application Ser. No. 11/678,781, entitled SYSTEM AND METHOD FOR REPRESENTING CONTENT.

Returning to FIG. 5, once the one or more group content representations applicable to the eligible content are identified, the group CR engine 48 displays one or more of the identified group content representations (step 110). In one embodiment, if the number of applicable group content representations is small, all of the applicable group content representations may be selected for presentation to the user 26-1. In another embodiment, the user preferences of the user 26-1 may be used to filter the applicable content representations. For example, if the preferred genre of the user 26-1 is Country and the applicable group content representations include a Country group content representation and a Rock group content representation, the group CR engine 48 may filter the applicable group content representations such that only the Country group content representation is presented to the user 26-1.

In addition to or as an alternative to filtering, the group CR engine 48 may use a layering technique based on, for example, a distance between the avatars of the selected participants in the group and the avatar of the user 26-1 in the virtual environment. The distance may be the distance from a central point among the selected participants in the group, an average distance between the avatar of the user 26-1 and the avatars of the selected participants in the group, or the like. When the distance is relatively large, a high level group content representation may be selected for presentation to the user 26-1. For example, the music content representation may be presented. If the distance then decreases to a predetermined threshold, the group CR engine 48 may select one or more new content representations or an additional content representation at a lower level or finer resolution. For example, once the distance falls below the threshold, the group CR engine 48 may operate to effect presentation of the Country and Rock group content representations in addition to or in place of the music group content representation.

Once the one or more content representations are selected by the group CR engine 48, the group CR engine 48 interacts with the environment generation engine 46 to effect presentation of the selected group content representations to the user 26-1 at the client device 24-1. Thereafter, based on the group content representation(s), the user 26-1 can easily determine whether content of interest is available from the group. In addition, the user 26-1 may interact with the group content representation to further explore the content made accessible by the group and to obtain content if desired.

For more information regarding an exemplary layering technique and an exemplary system and method for interacting with content representations, the interested reader is directed to U.S. patent application Ser. No. 11/678,798, entitled LAYERED VISUALIZATION OF CONTENT REPRESENTATIONS and U.S. patent application Ser. No. 11/678,813, entitled INTERACTIVE CONTENT REPRESENTATIONS ENABLING CONTENT SHARING, both of which were filed on Feb. 26, 2007 and are hereby incorporated herein by reference in their entireties.

FIGS. 7A through 7C illustrate the identification and selection of participants for a dynamic group content representation according to an exemplary embodiment of the present invention. Note that FIGS. 7A through 7C are exemplary and are not intended to limit the scope of the present invention. In this example, the attributes of the dynamic group content representation include a boundary, a user boundary, and a user density. The boundary is the line-of-sight of the viewing avatar ("viewer"), the user boundary is a 30 ft square, and the user density is five avatars within the user boundary of 30 ft square. As illustrated in FIG. 7A, there are not five avatars within a 30 ft square within the line-of-sight of the viewer. In FIG. 7B, the line-of-sight has changed such that the avatars of five potential participants for the group are within the line-of-sight of the viewer. However, the user boundary and density criteria are not met. More specifically, there is no group of at least five avatars within a 30 ft square within the viewer's line-of-sight. In FIG. 7C, the line-of-sight has changed such that the avatars of six potential participants for the group are within the line-of-sight of the viewer. In addition, the avatars of five of the potential participants are within a 30 ft square. As such, the group CR engine 48 (FIG. 4) selects the five potential participants represented by the avatars as the participants for the group, generates a summary or aggregate metadata describing eligible content made accessible by those participants, identifies a group content representation applicable to the group of participants based on the summary or aggregate metadata, and displays the group content representation in the view of the virtual environment provided to the viewer.

FIG. 8 is a block diagram of an exemplary embodiment of the VE server 22-1 according to one embodiment of the present invention. This discussion is equally applicable to the other VE servers 22-2 through 22-$N_1$. In general, the VE server 22-1 includes a control system 50 having associated memory 52. In this example, the VE engine 32, which includes the logic server 44, the environment generation engine 46, and the group CR engine 48, is implemented in software and stored in the memory 52. However, the present invention is not limited thereto. The VE server 22-1 also includes one or more digital storage devices 54 such as, for example, one or more hard disc drives, one or more optical storage devices, or the like. The digital storage devices 54 may operate to store the databases 34-42 (FIG. 4). The VE server 22-1 also includes a communication interface 56 communicatively coupling the VE server 22-1 to the central VE server and database 20 (FIG. 3) and the client devices 24-1 through 24-N$_2$ (FIG. 3) via one or more networks. The VE server 22-1 may also include a user interface 58, which may include components such as, for example, a display, one or more user input devices, and the like.

FIG. 9 is a block diagram of an exemplary embodiment of the client device 24-1 according to one embodiment of the present invention. This discussion is equally applicable to the other client devices 24-2 through 24-N$_2$ and 28-1 through 28-N$_3$. In general, the client device 24-1 includes a control system 60 having associated memory 62. The memory 62 may store software instructing the client device 24-1 to operate according to the present invention. The client device 24-1 also includes one or more digital storage devices 64 such as, for example, one or more hard disc drives, one or more optical storage devices, or the like. The digital storage devices 64 may operate to store the content shared by or otherwise made accessible by the user 26-1 of the client device 24-1. The client device 24-1 also includes a communication interface 66 communicatively coupling the client device 24-1 to the VE server 22-1 via a network. The client device 24-1 may also include a user interface 68, which may include components such as, for example, a display, one or more user input devices, and the like.

While the discussion above focuses on the group CR engine 48 with respect to a virtual environment, the present invention is not limited thereto. The group CR engine 48 should be viewed as an additive technology that may be implemented in any type of system where it is desirable to have group content representations enabling users to easily determine whether content of interest is shared or otherwise made accessible by groups of other users in the system. More specifically, FIG. 10 illustrates a system 70 providing content representations according to one embodiment of the present invention. The system 70 may be, for example, a system providing custom webpages for users such those provided by MYSPACE™ web service, a Peer-to-Peer (P2P) content sharing network, a mobile system such as a cellular network or a wireless ad hoc network formed using a standard such as one of the suite of IEEE 802.11 standards or the Bluetooth standard, or the like.

In general, the system 70 includes a server 72 and a number of client devices 74-1 through 74-N$_4$ connected by a network 76. The network 76 may be any type of Wide Area Network (WAN), Local Area Network (LAN), or any combination thereof and may include wired components, wireless components, or both wired and wireless components. For example, the network 76 may be the Internet. The client devices 74-1 through 74-N$_4$ have associated users 78-1 through 78-N$_4$.

The server 72 includes a group CR engine 48', a content metadata database 34', and a group CR content and rules database 40'. The group CR engine 48', the content metadata database 34', and the group CR content and rules database 40' are substantially the same as the group CR engine 48, the content metadata database 34, and the group CR content and rules database 40 discussed above. However, the specific details of each may vary depending on the embodiment of the system 70.

As a first example, the system 70 may be a system providing custom webpages for the users 78-1 through 78-N$_4$, where the webpages are hosted by the server 72. Thus, in addition to the content metadata describing content shared or otherwise made available by the users 78-1 through 78-N$_4$, the server 72 hosts custom webpages for the users 78-1 through 78-N$_4$. For example, the custom webpages may be similar to those provided by MySpace. In operation, when the user 78-1 interacts with the client device 74-1 to request the webpage of, for example, the user 78-N$_4$ from the server 72, the group CR engine 48' operates to present one or more group content representations in association with the webpage of the user 78-N$_4$ where the group content representations are descriptive of content shared by or otherwise made accessible by one or more groups of users such as friends of the user 78-N$_4$ that are identified by, for example, pictures and user names on the webpage of the user 78-N$_4$. There may be a single group content representation for all of the friends of the user 78-N$_4$ or group content representations for one or more subsets or groups of the friends of the user 78-N$_4$. The groups may be identified in a manner similar to that discussed above. For example, the participants may be selected from the potential participants, which in this case are the friends of the user 78-N$_4$, based on participation rules and content preferences for the group content representation. The group content representations for the groups may then be identified based on aggregate metadata for the groups and user preferences of the user 78-1. The group content representations may then be displayed as, for example, a graphic within the webpage or the like.

More specifically, as discussed above, the group CR engine 48' may identify the applicable group content representations for the content made accessible by a group of participants. The group CR engine 48' may then effect presentation of all of the applicable content representations. Alternatively, the group CR engine 48' may filter the applicable group content representations based on user preferences of the user 78-1 and present one or more of the filtered group content representations to the user 78-1 in association with the webpage. In addition or alternatively, the group CR engine 48' may perform a layering technique based on, for example, the actual physical distance between the user 78-1 and participants in the group or the user 78-N$_4$. The actual physical distance may be determined using, for example, location information from Global Positioning System (GPS) receivers associated with the user 78-1 and the participants in the group or the user 78-N$_4$, based on Internet Protocol (IP) addresses of the client device 74-1 and the client devices of the participants in the group or the client device 74-N$_4$, or the like.

As a second example, the system 70 may be a P2P content sharing network. In this example, the system 70 is more specifically a hybrid P2P content sharing system wherein the server 72 also provides a proxy function acting as an intermediary between the client devices 74-1 through 74-N$_4$ or provides a connection set-up function for establishing direct P2P connections between the client devices 74-1 through 74-N$_4$. The group CR engine 48' may operate to effect presentation of group content representations to the user 78-1 as, for example, part of a query response where the group content representations are displayed in association with identifiers of the users or peers in the P2P content sharing network forming the corresponding groups. More specifically, when presenting the query response to the user 78-1, users or peers identified in the query response may be grouped and group content representations may be identified and displayed in association with the groups.

In addition or alternatively, the user 78-1 may maintain a "buddy list" identifying other users in the system 70. As an example, the users in the buddy list of the user 78-1 may be divided into groups such as "family," "friends," and "co-workers." Group content representations may be identified and displayed for each of the groups of users.

As a third example, the system 70 may be a mobile network such as a cellular network. The user 78-1 may maintain a "buddy list" identifying a number of other users or an address book, where the buddy list or address book may divide the users into groups such as "family," "friends," and "co-workers." Group content representations may be identified and displayed for each of the groups at the client device 74-1 of the user 78-1.

The examples above are intended to illustrate that the present invention is not limited to a virtual environment system as described above with respect to FIGS. 1-9 and should not be considered to limit the scope of the present invention. One of ordinary skill in the art will appreciate that the group CR engine 48, 48' of the present invention is an additive technology that may be incorporated in any type of system wherein group content representations are desirable.

FIG. 11 is a block diagram of an exemplary embodiment of the server 72 of FIG. 10 according to one embodiment of the present invention. In general, the server 72 includes a control system 80 having associated memory 82. In this example, the group CR engine 48' is implemented in software and stored in the memory 82. However, the present invention is not limited thereto. The server 72 also includes one or more digital storage devices 84 such as, for example, one or more hard disc drives, one or more optical storage devices, or the like. The digital storage devices 84 may operate to store the content metadata database 34' and the group CR content and rules database 40' (FIG. 10). The server 72 also includes a communication interface 86 communicatively coupling the server 72 to the network 76 (FIG. 10). The server 72 may also include a user interface 88, which may include components such as, for example, a display, one or more user input devices, and the like.

FIG. 12 is a block diagram of an exemplary embodiment of the client device 74-1 according to one embodiment of the present invention. This discussion is equally applicable to the other client devices 74-2 through 74-N₄. In general, the client device 74-1 includes a control system 90 having associated memory 92. The memory 92 may store software instructing the client device 74-1 to operate according to the present invention. The client device 74-1 also includes one or more digital storage devices 94 such as, for example, one or more hard disc drives, one or more optical storage devices, or the like. The digital storage devices 94 may operate to store the content shared by or otherwise made accessible by the user 78-1 of the client device 74-1. The client device 74-1 also includes a communication interface 96 communicatively coupling the client device 74-1 to the server 72 via the network 76 (FIG. 10). The client device 74-1 may also include a user interface 98, which may include components such as, for example, a display, one or more user input devices, and the like.

Those skilled in the art will recognize improvements and modifications to the preferred embodiments of the present invention. All such improvements and modifications are considered within the scope of the concepts disclosed herein and the claims that follow.

What is claimed is:

1. A method comprising:
    identifying a plurality of users represented by avatars within a defined area of a virtual environment as a plurality of potential participants for a group where the defined area is a dynamic area of the virtual environment and the dynamic area is defined based on a line-of-sight of an avatar representing an interested user in the virtual environment;
    selecting ones of the plurality of potential participants as the participants for the group, thereby identifying participants for the group;
    combining metadata describing content made accessible by the participants to provide aggregate metadata;
    identifying a group content representation that is descriptive of the content made accessible by the participants based on the aggregate metadata; and
    effecting presentation of the group content representation to the interested user at a client device, wherein effecting presentation of the group content representation comprises effecting presentation of the group content representation in a view of the virtual environment provided to the interested user at the client device.

2. The method of claim 1 wherein the defined area is a fixed area of the virtual environment.

3. The method of claim 1 wherein the defined area is defined by a boundary defining an outer limit of the defined area and at least one of a group consisting of: an inclusion attribute identifying at least one type of area within the virtual environment to be included in the defined area and an exclusion attribute identifying at least one type of area within the virtual environment to be excluded from the defined area.

4. The method of claim 1 wherein selecting the ones of the plurality of potential participants as the participants for the group comprises selecting the ones of the plurality of potential participants as the participants for the group based on at least one criterion.

5. The method of claim 1 wherein selecting the ones of the plurality of potential participants as the participants for the group comprises selecting the ones of the plurality of potential participants as the participants for the group based on at least one participation rule.

6. The method of claim 5 wherein the at least one participation rule comprises at least one of a group consisting of: a participation rule defining a desired user rating for participants in the group, a participation rule defining a desired range of user ratings for participants in the group, a participation rule defining a maximum distance between the interested user and the participants in a social network, a participation rule related to duration of time at a particular location within the virtual environment, a participation rule defining a desired range of virtual distances between the avatar representing the interested user and the avatars representing the participants in the group, a participation rule defining a desired range of network distances between the client device of the interested user and client devices of the participants in the group, and a participation rule defining a desired range of physical distances between the interested user and the participants in the group.

7. The method of claim 1 wherein selecting the ones of the plurality of potential participants as the participants for the group comprises selecting the ones of the plurality of potential participants as the participants for the group based on at least one content preference.

8. The method of claim 1 wherein selecting the ones of the plurality of potential participants as the participants for the group comprises selecting the ones of the plurality of potential participants as the participants for the group based on a desired user boundary.

9. The method of claim 1 wherein selecting the ones of the plurality of potential participants as the participants for the group comprises selecting the ones of the plurality of potential participants as the participants for the group based on a combination of a desired user boundary and a desired user density.

10. The method of claim 1 wherein identifying the group content representation comprises:
    identifying a plurality of applicable group content representations based on the aggregate metadata, each of the plurality of applicable group content representations being descriptive of at least a portion of the content made accessible by the participants for the group; and selecting the group content representation from the plurality of applicable group content representations based on preferences of the interested user.

11. The method of claim 1 wherein effecting presentation of the group content representation in the view of the virtual environment provided to the interested user at the client device comprises effecting presentation of the group content representation at a fixed location in the virtual environment.

12. The method of claim 1 wherein effecting presentation of the group content representation in the view of the virtual environment provided to the interested user at the client device comprises effecting presentation of the group content representation at a dynamic location in the virtual environment.

13. The method of claim 12 wherein the dynamic location is a location relative to the avatars representing the participants in the virtual environment.

14. The method of claim 1 further comprising effecting presentation of indicia identifying at least one key participant of the participants of the group in the view of the virtual environment provided to the interested user at the client device.

15. A system comprising:
a communication interface communicatively coupling the system to a plurality of client devices via a network, wherein each of the plurality of client devices is associated with one of a plurality of users; and
a control system associated with the communication interface adapted to:
identify a plurality of potential participants for a group from the plurality of users represented by avatars within a defined area of a virtual environment where the defined area is a dynamic area of the virtual environment and the dynamic area is defined based on a line-of-sight of an avatar representing an interested user in the virtual environment;
select ones of the plurality of potential participants as the participants for the group, thereby identifying participants for the group from the plurality of users;
combine metadata describing content made accessible by the participants to provide aggregate metadata;
identify a group content representation that is descriptive of the content made accessible by the participants based on the aggregate metadata; and
effect presentation of the group content representation to the interested user from the plurality of users at one of the plurality of client devices associated with the interested user, wherein effecting presentation of the group content representation comprises effecting presentation of the group content representation in a view of the virtual environment provided to the interested user at the one of the plurality of client devices.

16. The system of claim 15 wherein the control system is further adapted to select the ones of the plurality of potential participants as the participants for the group based on at least one criterion.

17. The system of claim 15 wherein in order to identify the group content representation, the control system is further adapted to:
identify a plurality of applicable group content representations based on the aggregate metadata, each of the plurality of applicable group content representations being descriptive of at least a portion of the content made accessible by the participants for the group; and
select the group content representation from the plurality of applicable group content representations based on preferences of the interested user.

18. The system of claim 15 wherein the control system is further adapted to effect presentation of the group content representation at a fixed location in the virtual environment.

19. The system of claim 15 wherein the control system is further adapted to effect presentation of the group content representation at a dynamic location in the virtual environment.

20. The system of claim 19 wherein the dynamic location is a location relative to the avatars representing the participants in the virtual environment.

\* \* \* \* \*